United States Patent [19]

Koontz

[11] Patent Number: 5,434,384
[45] Date of Patent: Jul. 18, 1995

[54] COATED WINDSHIELD WITH SPECIAL HEATING CIRCUIT FOR WIPER ARM STORAGE AREA

[75] Inventor: Harry S. Koontz, Pittsburgh, Pa.

[73] Assignee: PPG Industries, Inc., Pittsburgh, Pa.

[21] Appl. No.: 733,785

[22] Filed: Jul. 22, 1991

[51] Int. Cl.⁶ .............................................. H05B 1/02
[52] U.S. Cl. ..................................... 214/203; 219/547
[58] Field of Search ............... 219/203, 543, 522, 547, 219/541; 52/171; 244/134 D; 296/84.1

[56] References Cited

U.S. PATENT DOCUMENTS

| | | | |
|---|---|---|---|
| 3,794,809 | 2/1974 | Beck et al. | 219/203 |
| 4,109,133 | 8/1978 | Häle et al. | 219/203 |
| 4,373,130 | 2/1983 | Krasborn et al. | 219/203 |
| 4,378,484 | 3/1983 | Kunert | 219/203 |
| 4,513,196 | 4/1985 | Bartelsen et al. | 219/203 |
| 4,543,466 | 9/1985 | Ramus | 219/203 |
| 4,610,771 | 9/1986 | Gillery | 204/192 |
| 4,654,067 | 3/1987 | Ramus et al. | 65/60 |
| 4,820,902 | 4/1989 | Gillery | 219/203 |
| 4,910,380 | 3/1990 | Reiss et al. | 219/203 |
| 4,971,848 | 11/1990 | Ruelle et al. | 219/203 |
| 4,994,650 | 2/1991 | Koontz | 219/497 |

FOREIGN PATENT DOCUMENTS

| | | |
|---|---|---|
| 2592544 | 7/1987 | France . |
| 0150979 | 9/1981 | Germany .............................. 219/203 |
| 2186769 | 8/1987 | United Kingdom . |

Primary Examiner—Bruce A. Reynolds
Assistant Examiner—Michael D. Switzer
Attorney, Agent, or Firm—Andrew C. Siminerio

[57] ABSTRACT

A windshield having an upper vision area with a coating and a lower heating area aligned with a wiper blade storage area. When the coating is electroconductive, first and second bus bars are provided to selectively connect the coating to the terminals of a power source to provide a windshield heating circuit for defogging or defrosting its vision area. One of the bus bars is also connected to a heating element along a lower area of the windshield that faces a storage area for windshield wipers. The heating element is selectively connected to a different terminal of the power source from the terminal connected to one of the bus bars to cooperate with one of the bus bars and the power source to provide a storage area heating circuit. The windshield heating circuit and the storage area heating circuit may be operated independently, either separately or simultaneously, from a common electric power source.

16 Claims, 2 Drawing Sheets

COATED WINDSHIELD WITH SPECIAL HEATING CIRCUIT FOR WIPER ARM STORAGE AREA

BACKGROUND OF THE INVENTION

This invention relates to a coated windshield for automobiles having an upper vision area coated with an electroconductive and/or heat-screening coating and a lower electroconductive heating circuit facing a lower area where windshield wipers are stored when windshield wiper arms are at rest.

Prior to this invention, some windshields have been provided with electroconductive coatings over the vision area to provide defrosting, deicing or defogging capability and/or heat-screening coatings to reduce heat buildup within the automobile. Such windshields have not been provided with means to heat a storage area for wiper arms.

Other windshields have been developed to incorporate a heating circuit in the portion of the windshield which extends below the level of an automobile hood facing an area where the windshield wipers are stored when not in use. This heating circuit overcomes blockage of the wipers onto the windshield during cold weather due to icing. However, to the best of our knowledge, windshields provided with a special heating circuit to heat stored windshield wipers have not been provided with any coatings in the vision area to provide heat-screening, defrosting, deicing and/or defogging capability. This observation will become obvious in the light of a discussion of relevant patents that came to our attention as a result of a novelty search performed to determine the novelty of this invention.

DISCUSSION OF RELEVANT PATENTS

U.S. Pat. No. 4,373,130 to Krasborn et. al. discloses a windshield, which may be either monolithic or laminated, that carries an electrical resistance heating element only in its lower region for heating the region facing an area where the wipers are stored. The vision area of the windshield is not provided with a coating.

U.S. Pat. No. 4,378,484 to Kunert discloses a circuit in the lower region of a laminated windshield for heating the wiper blade storage area like the Krasborn et. al. patent, and also incorporates scrapers on the outer windshield surface to scrape water from the windshield when the wiper blades pass over the scrapers. The vision area of the Kunert windshield is uncoated like the Krasborn et. al. windshield.

U.S. Pat. No. 4,543,466 to Ramus discloses an electrically heated windshield of generally trapezoidal shape and teaches how to construct and arrange the lines of contact of upper and lower bus bars with a continuous, uniformly thick trapezoidal-shaped electrically conductive coating so as to heat the coating substantially uniformly. This patent is silent as to any incorporation of a heating circuit to heat an area where wiper blades are stored.

U.S. Pat. No. 4,654,067 to Ramus et. al. discloses a method of fabricating a bent laminated windshield having an electroconductive coating for defogging and deicing. No provision is mentioned of a localized heating circuit to face an area of wiper blade storage.

U.S. Pat. No. 4,820,902 to Gillery discloses a laminated electrically heated transparency with a special bus bar arrangement provided with closely spaced leads that enable the bus bars to be connected to a source of electricity in a compact area. No provision is mentioned of a heating circuit to heat a local area facing a storage area for wiper blades.

U.S. Pat. No. 4,910,380 to Reiss et. al. discloses a laminated windshield having a black border containing a circuit of electroconductive material, part of which faces a wiper-rest position. The main vision area enclosed by the black border is shown to be uncoated. The black border may serve for edge heating or for glazing or removal of a glazing seal along the edge, but is incapable of defogging or deicing the main vision portion of the windshield.

BRIEF DESCRIPTION OF THIS INVENTION

This invention provides a windshield that is both coated in its vision area and provided with a wiper blade heating circuit that faces an area where wiper blades are stored. The coating in the vision area may be electroconductive and/or heat absorbing. Therefore, the wiper blade heating circuit may be used to release the wiper arms from a state of blockage and the electroconductive coating may be energized to defog or deice the vision area of the windshield either simultaneously or sequentially. In one particular embodiment of the invention wherein the coating in the vision area is powered by a heating circuit including a pair of bus bars along opposite sides of the coating to pass electrical current through the coating in the vision area, one of the bus bars is connected to both the electroconductive coating over the vision area and to the heating circuit for the storage area. Leads from bus bars to power source extends from a compact portion of the windshield perimeter.

The benefits of this invention will be better understood in the light of a description of several embodiments that follows.

DESCRIPTION OF SPECIFIC EMBODIMENTS

Figure 1:
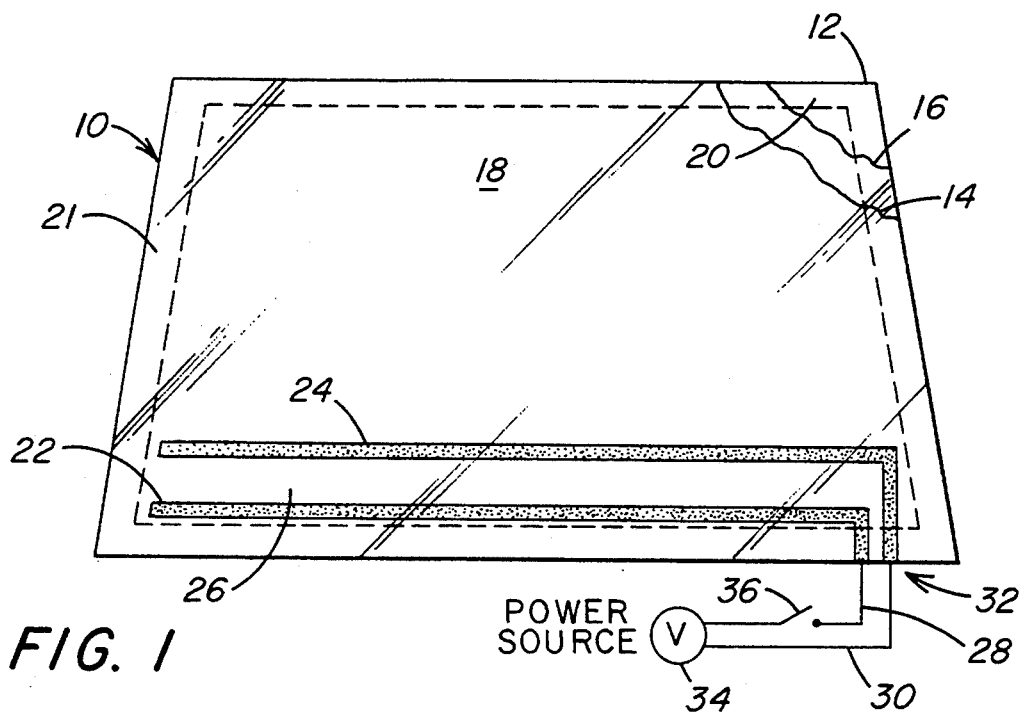
FIG. 1 is a plan view of a coated windshield having the lower part of the coating serve as a heating element for a storage area for wiper blades.

A windshield 10, which may be either monolithic or laminated, as shown in FIG. 1, includes an outer glass ply 12, an inner glass ply 14 and a plastic interlayer 16 which may be polyvinylbutyral as is commonly used for laminated windshields. An electroconductive coating 18 is positioned on the inner surface 20 of outer ply 12 with an uncoated frame area 21 surrounding a vision area of the windshield 10. The coated area has heat screening properties and preferably has a transparency of at least 70% in the visible frequency range. A pair of spaced apart bus bars including a first bus bar 22 and a second bus bar 24 extend across the lower portion of windshield 10 to delineate a lower heating area 26 between bus bars 22 and 24. Heating area 26 is part of coating 18 and faces a storage area for windshield wipers when the windshield 10 is installed in a vehicle. A lead line 28 is provided as extension means for first bus bar 22 and another lead line 30 is provided as extension means for second bus bar 24. The lead lines 28 and 30 extend from a terminal area 32 of the windshield and are connected to corresponding terminals of a power source 34, e.g., a 12 volt D.C. battery. Although not limiting in the present invention, bus bars 22 and 24 may be wire members or a silver ceramic materials that are heated and fused to the glass sheet surface. Bus bars 22 and 24, lead lines 28 and 30, coating 18 between the bus bars within the heating area 26 and power source 34 form a wiper area heating circuit. Switching means 36 is positioned along line 28 to control activation of the wiper area heating circuit.

The heating capability of the area 26 is expressed in terms of surface watt density which is a measurement of power dissipation per unit area; the greater the surface watt density, the more power dissipated in the measured area and thus the greater the heating capability. Surface watt density is calculated as follows:

$$SWD = \frac{V^2}{L^2 R}$$

wherein: SWD = surface watt density in watts per unit area
R = film surface resistivity in ohms per square
L = distance between the power connection of the coating
V = voltage Although not limiting in the present invention, the surface watt density is preferably maintained in the range of 1 to 2 watts per square inch. It should be appreciated that since the distance L between the bus bars in FIG. 1 is small, a low power source may be used to obtain the desired surface watt density.

To illustrate the interrelationship between these design variables, Table 1 shows the film coating resistivity required to produce various surface watt densities at selected bus bar spacings for a 60 inch (152.4 cm) wide heating area 26, powered by a 12 volt power source.

TABLE 1

| SWD = 1 | | SWD = 1.5 | | SWD = 2 | |
|---|---|---|---|---|---|
| R | L | R | L | R | L |
| 4 | 6 | 4 | 4.9 | 4 | 4.2 |
| 8 | 4.2 | 8 | 3.5 | 8 | 3 |
| 16 | 3 | 16 | 2.5 | 16 | 2 |
| 25 | 2.4 | 25 | 2 | 25 | 1.7 |
| 32 | 2 | 32 | 1.7 | 32 | 1.4 | wherein: SWD = surface watt density (watts/inch$^2$)
p1 R = film surface resistivity (ohms/square)
L = distance between bus bars (inches)

As discussed above, the higher the surface watt density, the more heat produced in wiper area 26.

In the embodiment of FIG. 1, when a potential difference is applied between bus bars 22 and 24, virtually all the heat is produced in lower heating area 26 between bus bars 22 and 24, even when electroconductive coating 18 extends on opposite sides of at least one of said bus bars. The part of coating 18 to one side of both bus bars 22 and 24 is mainly useful for its glare reducing characteristics not found in prior art windshields having heating means for wiper storage areas.

In the embodiment of FIG. 1, power is applied across bus bars 22 and 24, uniform heating results when the bus bars are uniformly spaced from one another along their length and the portion of coating 18 in area 26 is uniformly thick. If localized heating is desired, the bus bars may be arranged to be closer to one another in any area facing the storage area where additional heat is desired.

Windshield 10 provides a lower heating area 26 for loosening windshield wipers when they are blocked by frozen ice from movement in combination with a coating 18 in the vision area that reduces glare. The prior art windshields that had a localized heating means facing the wiper storage area were not coated in the vision area.

Coating 18 may be composed of any well known material having the combination of transparency and electroconductivity desired. A preferred coating is disclosed in U.S. Pat. No. 4,610,771 to Gillcry, the disclosure of which is incorporated herein by reference. That coating comprises a film of silver sandwiched between a pair of zinc stannate films, each film being applied by magnetic sputtering. The bus bars are composed of finely divided silver particles in a ceramic matrix that is applied to a glass sheet surface and bonded thereto, preferably while the sheet is heated to bend the sheet. The bus bars 22 and 24 and lead lines 28 and 30 are much more electroconductive than coating 18 so that when a potential difference is applied between bus bars 22 and 24, heat is generated within lower heating area 26 rather than in bus bars 22 and 24 and lead lines 28 and 30.

Figure 2:
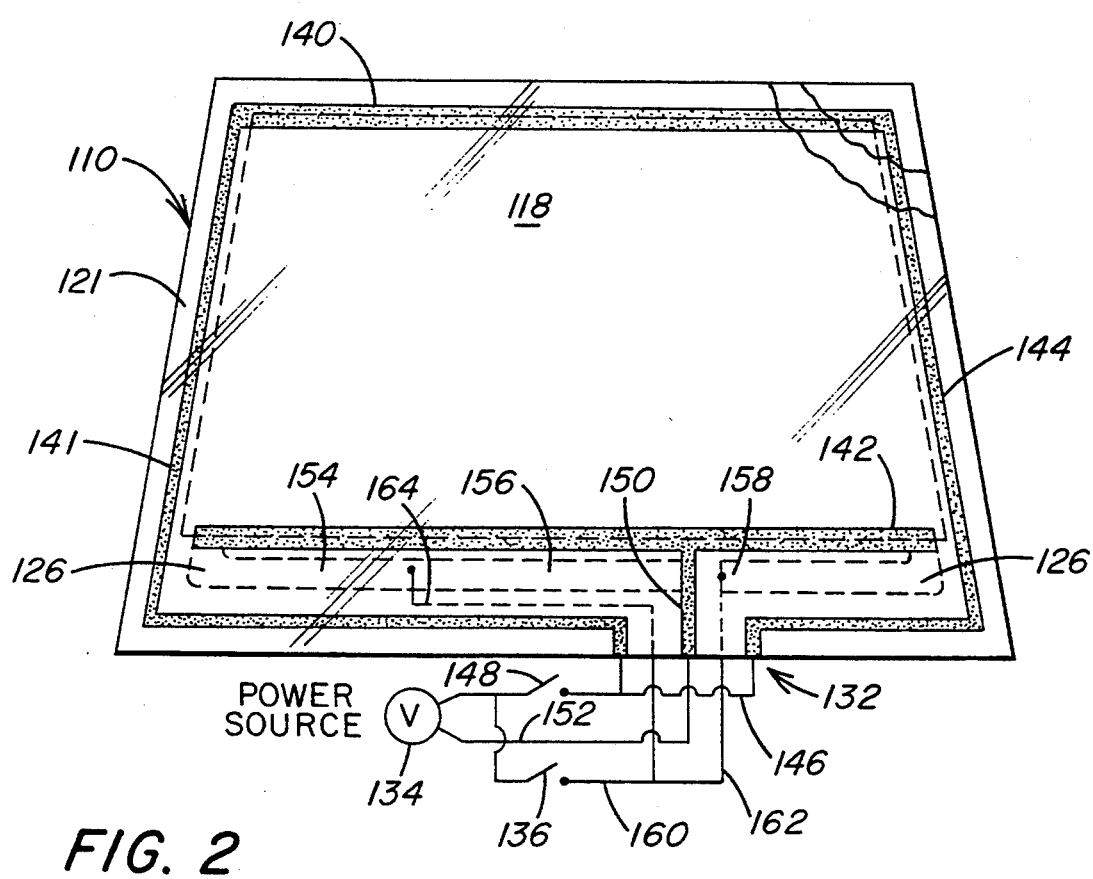
FIG. 2 is a plan view of a coated windshield having a lower portion containing one embodiment of a heating circuit for a storage area for wiper blades that utilizes a bus bar of a windshield heating circuit incorporated therein as part of the storage area heating circuit.

FIG. 2 illustrates another embodiment of the invention wherein an electroconductive film 118 for heating the vision area of the windshield 110 is provided within frame area 121 with a first bus bar 140 and a second bus bar 142. Although not limiting in the present invention, in the particular embodiment illustrated in FIG. 2, the vision area is provided with a dual lead bus bar arrangement as disclosed in U.S. Pat. No. 4,820,902 to Gillcry, which teachings are incorporated by reference. More particularly, first bus bar 140 contacts the upper edge of film 118 and continues via extension 144 around uncoated frame area 121 in spaced relation to the side edges of film 118 to a terminal area 132 where extensions 144 are connected to lead lines 146 at the bottom edge of windshield 110 for connection to a common terminal of a power source 134 through suitable switching means 148. Second or lower bus bar 142 has an extension 150 that is attached through a lead line 152 at terminal area 132 to another terminal of the voltage source 134. Lead 152 is preferably free of switch means. Although not limiting in the present invention, bus bars 140 and 142 and extensions 144 and 150 are preferably made of a silver ceramic frit material that is heated and fused to the surface 120 of outer glass ply 112. The bus bars 140 and 142, extensions 144 and 150, lead lines 146 and 152, and power source 134 form a heating circuit whereby the coating 118 is heated to defrost the vision area of the windshield 110.

Heating area 126 includes strips of electroconductive coatings 154, 156, and 158, preferably of the same composition as coating 118, which are applied to longitudinally extending area 126 along the bottom edge portion of uncoated frame area 121 and are generally spaced from lower bus bar 142 to provide heating means for the windshield wiper blades storage area comparable to heating area 26 of the FIG. 1 embodiment. The first strip portion 154 has its left end upturned to make electrical contact with the left end of second bus bar 142. A second strip portion 156 extends continuously from the first strip portion 154 and is connected at its right end to extension means 150 of second bus bar 142. The third strip portion 158 is upturned at its right end to make electrical contact with the right end of second bus bar 142 and extends toward second strip portion 156, terminating just short of extension 150.

An insulated lead wire 160 has two branches. One of these branches 162 connects a storage area heater power source, preferably source 134, to the left end of third strip portion 158 and the other branch 164 of lead wire 160 connects the power source 134 to a point along first and second strip portions 154 and 156. In practice, branches 162 and 164 may be either a wire or a silver ceramic material similar to the bus bars and extensions. Lead wire 160, like lead 146 has a switch means 136. Extension 150 from second bus bar 142 is coupled to the voltage source 134 for the heating circuit of windshield 110 through lead 152, as discussed earlier.

In this manner, the storage area heater circuit provides three wiper storage area heating circuits: the first circuit running from branch 164 of lead wire 160 to strip 154 to lower bus bar 142 to extension 150 to lead 152; the second heating circuit running from branch 164 of lead wire 160 to second strip portion 156 to extension 150 to lead 152 the third heating circuit running from branch 162 of lead wire 160 to third strip portion 158 (electrically insulated at its left end from extension 150) to the right end of lower bus bar 142 to extension 150 to lead 152. Thus, switch 148 leading to the common lead 146 for extensions 144 controls the heating circuit controlling enerigization of electroconductive coating 118 in the windshield vision area and switch 136 connecting lead 160 to its associated strip portions 154, 156 and 158 of the storage area heating circuit controls the wiper storage area heating circuits. Since each switch can be operated independently of the other, operation of the vision area heating circuit can be made independently of the operation of the wiper storage area heating power circuit, despite the fact that both utilize the lower bus bar 142.

As is obvious from FIG. 2, the length of each strip portion 154, 156 and 158 depends in part on the position of terminal 132 alone the edge of windshield 110 and the connecting point of branch 164 along strips 154 and 156. Although not limiting in the present invention, in the particular embodiment illustrated in FIG. 2, branch 164 and terminal 132 are positioned such that strip portions 154, 156 and 158 are all the same length and therefore provide the same electrical resistance.

If desired, the terminal area 132 may be modified to eliminate one of the branches of lead wire 160. More particularly, rather than connecting the right end of strip portion 156 with extension 150, strip portion 156 may be extended over but electrical insulated from extension 150 and connect with the left end of strip 158. Although not limiting in the present invention, this may be accomplished using an insulated Jumper (not shown), preferably having the same resistance per unit length as the strip portions, to bridge over extension 150. In this manner, strips 154, 156 and 158 form a continuous strip that is connected to lower bus bar 142 at its opposite ends. Lead wire 160 will therefore require only a single connection to the continuous strip, preferably at the mid-point of the continuous strip, to form two heating circuits in the wiper storage area 126.

It is understood that the heating effect per unit length of the strip portions 134, 156 and 158 of FIG. 2 and the continuous strip described above is substantially uniform along the length of the storage area heating circuit when the strip portions have uniform cross-section along their length and that local variations in heating effect may be obtained by local variations in cross-section (preferably by reducing the width locally) where greater heating effect is desired.

The windshield configuration shown in FIG. 2 and discussed above is typical of an electrically heated windshield. Windshields of this type are generally powered by a power source ranging from 40 to 80 volts and have a film resistivity of 3 to 10 ohms per square. Because of this greater voltage as compared to the embodiment of the invention discussed in FIG. 1, the film resistivity, R, and/or the distance, L, between the power connections to the coating must be increased to provide an acceptable surface watt density in heating area 126. If the surface watt density is too high, area 126 may get too hot and "burn-out" the wiper storage area of the windshield. In the particular embodiment of the invention illustrated in FIG. 2, the film resistivity of strip portions 154, 156, and 158 is preferably the same as that for film 118. The required surface watt density in heating area 126 using this greater power source is achieved due to the increase in the distance, L, between the power connections to each strip portion. It should be appreciated that if strip portions 154, 156 and 158 had a film resistivity lower than that of film 118, the distance L could be reduced and still maintain the same surface watt density.

Based on the above, it should be obvious to one skilled in the art that the present invention is not limited to only three strip areas. The film in the wiper storage area may be divided into many sections each having the distance L necessary to produce the desired surface watt density.

Figure 3:
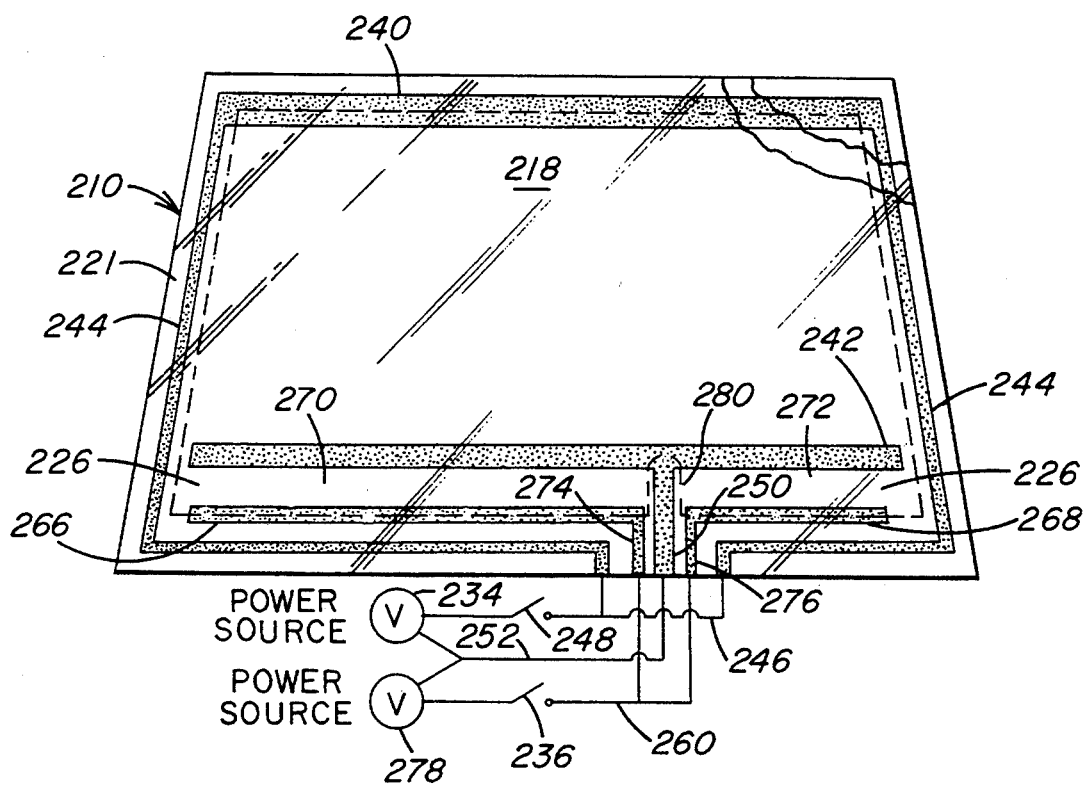
FIG. 3 is a plan view similar to FIG. 2 of another embodiment of this invention.

FIG. 3 illustrates an embodiment of the invention that combines a continuous film over both the main vision area and wiper storage area as shown in FIG. 1 and the vision area heating circuit as shown in FIG. 2. The vision area heating circuit of windshield 210 is similar to that described for FIG. 2, with coating 218, bus bars 240 and 242, extensions 244 and 250, lead wires 246 and 252, switch 248, and power source 234 forming the heating circuit for the vision area. The wiper storage area 226 includes bus bars 266 and 268 which extend along and are spaced from the left and right portions of the lower bus bar 242, respectively, and are electrically interconnected along their length with coating areas 270 and 272, respectively. Although not limiting in the present invention, in the particular embodiment illustrated in FIG. 3, coating 218 is continuous over bus bar 242 and extends over coating areas 270 and 272 to bus bars 266 and 268. Bus bars 266 and 268 have extensions 274 and 276, respectively, which are electrically interconnected to a power source 278, as discussed below, via line 260 which includes switch 236. Bus bars 266 and 268 and extensions 274 and 276 may be wires or a silver ceramic frit, as discussed earlier. The coating is deleted along line 280 from the areas between coatings 270 and 272 and extension 242 to prevent shorting of the heating arrangement in the wiper storage area. As an alternative to deleting the coating, a portion of extension 242 may be covered to electrically insulate an overlaying coating connecting coatings 270 and 272 from extension 242 and thus prevent shorting. In this manner when the wiper storage area circuit is energized, current passes between lower bus bar 242 and bus bars 266 and 268, through coating areas 270 and 272, respectively, to heat the wiper storage area.

In the wiper storage heating area configuration shown in FIG. 3, it is apparent that the distance L in areas 270 and 272 is less than that for the configuration shown in FIG. 2. As a result, in order to be able to use a continuous film of constant film resistivity throughout the windshield 210 and maintain the proper heating in both the vision area and wiper storage area, in the particular embodiment shown in FIG. 3, a second power source 278 is used to power the coatings in the wiper storage area. Although not limiting in the present invention, in one particular embodiment the coating has a surface resistivity of 8 ohms per square, the power source 234 is 70 volt and the power source 278 is 12 volt. As an alternative, a single power source may be used. This arrangement will require additional circuitry to provide the proper voltage to each heating area. Furthermore, it should be appreciated that if the resistance of coatings 270 and 272 are increased, a common power source with the same voltage may be used.

Each of the heating circuits previously discussed may be operated concurrently or independently. Preferably, the wiper storage area heating circuit is first energized while the vision area heating circuit is not used until the wiper blades are free to operate. Then the switch for the wiper storage heating area is opened and the switch for the vision area heating circuit is opened to clear the windshield by heat. The circuits may also be operated through a low power relay to operate simultaneously or according to a predetermined cycle on a time-share basis.

In the claims that follow, the term "heating element" is used generically to describe the heating area 26 of the FIG. 1 embodiment, the strip portions 154, 156 and 158 of heating area 126 in the FIG. 2 embodiment and the coating areas 270 and 272 of heating area 226 in the FIG. 3 embodiment.

The embodiments of this invention may also include a conventional black band about 1 to 1.25 inches (2.54 to 3.28 cm) wide around the perimeter for esthetics and a conventional crack detector circuit within the frame area 121 and 221 without departing from the gist of this invention. The presence of the conventional crack detector circuit does not affect the ability of the viewing area heating circuit of the windshield to operate independently of the circuit that heats the lower heating area facing the windshield wiper storage area. A typical crack detector circuit is described in U.S. Pat. No. 4,994,650 to Harry A. Koontz, the disclosure of which is incorporated by reference.

A method of fabricating a windshield incorporating the novel features of the present invention involves first applying a decorative band of black ink around the perimeter of a major surface of a glass sheet, drying the ink, applying silver ceramic bus bars, extensions and crack detector circuit lines (and any addition lead lines) through a screen printing process, heating to bend the sheet and fuse the ceramic material to the glass, masking areas of the bent glass to remain uncoated, applying the coating for the vision area and storage area heating circuits by magnetic sputtering vacuum deposition and laminating an uncoated glass sheet to the bent glass sheet.

Conforming to the provisions of the patent statues, the preferred construction and mode of operation of the present invention has been explained and what are now considered to be its best embodiments have been described and illustrated. However, it is understood that the invention may be practiced otherwise than as specifically illustrated and described within the scope of the claimed subject matter that follows.

What is claimed is:

1. A windshield having a glass sheet provided with an electroconductive coating over a major surface of said sheet, a first bus bar extending along a lower edge of said sheet and electrically interconnected along its length to said coating, a second bus bar spaced from and generally parallel to said first bus bar and electrically interconnected along its length to said coating wherein said second bus bar divides said coating into a first portion over an upper major vision area and a second portion over a lower heating area facing a wiper blade storage area, said second portion being bounded by said first and second bus bars, and means to connect only said bus bars to a power source to selectively heat said wiper blade storage area.

2. The windshield as in claim 1, wherein said coating over said major vision area is at least 70% transparent to visible light.

3. The windshield as in claim 1 wherein said second coating portion has a surface watt density between approximately 1 to 2 watts per square inch.

4. A windshield having a glass sheet provided with an electroconductive coating over a major surface of said sheet, said coating having a first portion over a major vision area of said sheet and a second portion over a wiper blade storage area, a peripherally extending uncoated frame area defining said vision and storage areas therein, an upper bus bar in electrical contact along its length with an upper edge of said first coating portion and having an extension which extends around said coating along said frame area in insulated relation to said coating, said upper bus bar extension constructed and arranged for connection of said upper bus bar to a first terminal of a power source, a lower bus bar in electrical contact along its length with a lower edge of said first coating portion and having an extension insulated from said upper bus bar extension, said lower bus bar extension being constructed and arranged for connection to a second terminal of said power source, whereby said upper and lower bus bars and said first coating portion cooperate with said power source to form a first heating circuit, and wherein said second coating portion is positioned along a lower portion of said sheet and spaced from said lower bus bar and lower bus bar extension, with a first end of said second coating portion electrically interconnected to said lower bus bar or lower bus bar extension and an opposing end of said second coating portion electrically interconnected to a terminal of said power source by a connector, whereby said lower bus bar or lower bus bar extension, said second coating portion and said connector cooperate with said power source to form a second heating circuit, and further including means to selectively direct power from said power source to said first and second heating circuits to selectively energize said first and second coating portions and heat said vision area and storage area, respectively.

5. The windshield as in claim 4 wherein said selective power directing means includes first switching means to control energizing of said first heating circuit and second switching means to control energizing of said second heating circuit.

6. The windshield as in claim 4 wherein the composition of said first and second coating portions of said electroconductive coating are substantially identical.

7. A windshield having a glass sheet provided with an electroconductive coating over a major surface of said sheet, said coating having a first portion over a major vision area of said sheet and a second portion over a wiper blade storage area, a peripherally extending uncoated frame area defining said vision and storage areas therein, an upper bus bar in electrical contact along its length with an upper edge portion of said first coating portion and having an extension which extends around said coating along said frame area in insulated relation to said coating, said upper bus bar extension being constructed and arranged for connection of said upper bus bar to a first terminal of a power source, a lower bus bar extending across and dividing said coating into said first and second portions, said lower bus bar being in electrical contact along its length with a lower edge of said first coating portion and an upper edge of said second coating portion and having an extension insulated from said upper bus bar extension, said lower bus bar extension being constructed and arranged for connection to a second terminal of said power source, whereby said upper and lower bus bars and said first coating portion cooperate with said power source to form a first heating circuit a bottom bus bar spaced from said lower bus bar and electrically interconnected along its length to said second coating portion wherein said coating extends continuously from said upper bus bar across said lower bus bar to said bottom bus bar, a connector being constructed and arranged to electrically interconnect said bottom bus bar to a terminal of said power source, whereby said lower bus bar, said second coating portion and said bottom bus bar cooperate with said power source to form a second heating circuit, and means to selectively direct power from said power source to said first and second heating circuits to selectively energize said first and second coating portions of said vision area and storage area, respectively.

8. The windshield as in claim 7 wherein said selective power directing means includes first switching means to control energizing of said first heating circuit and second switching means to control energizing of said second heating circuit.

9. The windshield as in claim 7 wherein said bottom bus bar includes two bottom bus bars extending on opposite sides of said lower bus bar extension.

10. The windshield as in claim 7 wherein the composition of said first and second coating portions of said electroconductive coating are substantially identical.

11. A windshield having a glass sheet provided with an electroconductive coating over a first major surface of said sheet, said coating having a first portion forming a first heating element over a major vision area of said sheet and a second portion forming a second heating element over a wiper blade storage area a peripherally extending uncoated frame area defining said vision and storage areas therein, an upper bus bar in electrical contact along its length with an upper edge of said first coating portion and having an extension which extends around said coating along said frame area in insulated relation to said coating, said upper bus bar extension being constructed and arranged for connection of said upper bus bar to a first terminal of a power source, a lower bus bar in electrical contact along its length with a lower edge of said first coating portion and having an extension insulated from said upper bus bar extension, said lower bus bar extension being constructed and arranged for connection to a second terminal of said power source, whereby said upper and lower bus bars and said first coating portion cooperate with said power source to form a first heating circuit for said first heating element, and wherein said second coating portion is positioned along a lower portion of said sheet and spaced from said lower bus bar with a first end of said second coating portion electrically interconnected to said lower bus bar and an opposing end portion of said second coating portion electrically interconnected to said lower bus bar extension, a connector constructed and arranged to electrically interconnect said second coating portion to a terminal of said power source at a location intermediate said ends of said second coating portion, whereby said lower bus bar, said lower bus bar extension, said second coating portion and said connector cooperate with said power source to form a second heating circuit for said second heating element, and means to selectively direct power from said power source to said first and second heating circuits to selectively energize said first and second coating portions and heat said vision area and storage area, respectively.

12. The windshield as in claim 11, further including means to electrically interconnect said second coating portion at selected sites along its length to said lower bus bar and said connector includes a plurality of connectors, each electrically interconnected with said second coating portion between said selected connection sites of said second coating portion to form a plurality of heating element portions.

13. The windshield as in claim 11, further including a third heating element including a third coating portion extending along a lower portion of said sheet on an opposite side of said lower bus bar extension, said third coating portion being spaced from said lower bus bar and lower bus bar extension and having a first end electrically interconnected to said lower bus bar and an opposing end electrically interconnected to a terminal of said power source by an addition connector, whereby said lower bus bar, said third coating portion and said additional connector cooperate with said power source to form a third heating circuit, and further wherein said power directing means includes means to selectively energize said third heating circuit.

14. The windshield as in claim 11 wherein the composition of said first and second coating portions of said electroconductive coating are substantially identical.

15. The windshield as in claim 11 wherein said selective power directing means includes first switching means to control energizing of said first heating circuit and a second switching means to control energizing of said second heating circuit.

16. The windshield as in claim 11 wherein said connecting wire is connected at the midpoint of said second coating portion.

* * * * *